(No Model.)

E. WESTON.
ELECTRICAL GENERATOR OR MOTOR.

No. 292,719. Patented Jan. 29, 1884.

Attest:
Raymond F. Barnes.
W. Frisby

Inventor:
Edward Weston
By Parker W. Page
Atty.

United States Patent Office.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL GENERATOR OR MOTOR.

SPECIFICATION forming part of Letters Patent No. 292,719, dated January 29, 1884.

Application filed January 31, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Generators or Motors, of which the following is a specification, reference being had to the drawings accompanying and forming a part of the same.

My present invention relates to improvements in the construction of dynamo-electric machines or motors, the said improvements comprising, mainly, an armature of novel character, and possessing certain peculiar advantages, the nature of which will be hereinafter explained, and field-magnets of a construction specially adapted for use with the said armature.

The core of my improved armature is constructed in the form of a flat disk, and the coils are wound upon it in diametrically-opposite divisions, and in a direction parallel to the axis of rotation. The chief advantages which result from giving to the core this shape are that a complete magnetic saturation of the core may be more easily effected from the relatively greater inductive effect that the field-magnets may be caused to exert upon it, and also that a greater proportionate amount of the inducing-conductors may be caused to pass at right angles through the magnetic lines of the field of force than is possible with armatures of other shapes. The coils for the armature are wound in any well-known way, and may be of any number within practical limits, for facilitating the winding of the coils. The periphery of the disk, however, is recessed or grooved in line with the axis of rotation, the depth of such recesses or grooves being sufficient to bring the surface of the coil or coils wound therein flush with the polar projections between the recesses. The field-magnet which I employ with an armature constructed in this manner consists, in the main, of two vertical cores, joined by pole-pieces conformed to the shape of the armature. The cores are wound with coils, which produce consequent poles of opposite kind in the aforesaid pole-pieces. Between these magnets the disk-armature is mounted, the shaft passing through the center of the coils, where bearings of proper kinds are provided.

Having now indicated the general character of the machine, I will describe the same more in detail by reference to the accompanying drawings, in which—

Figure 1:
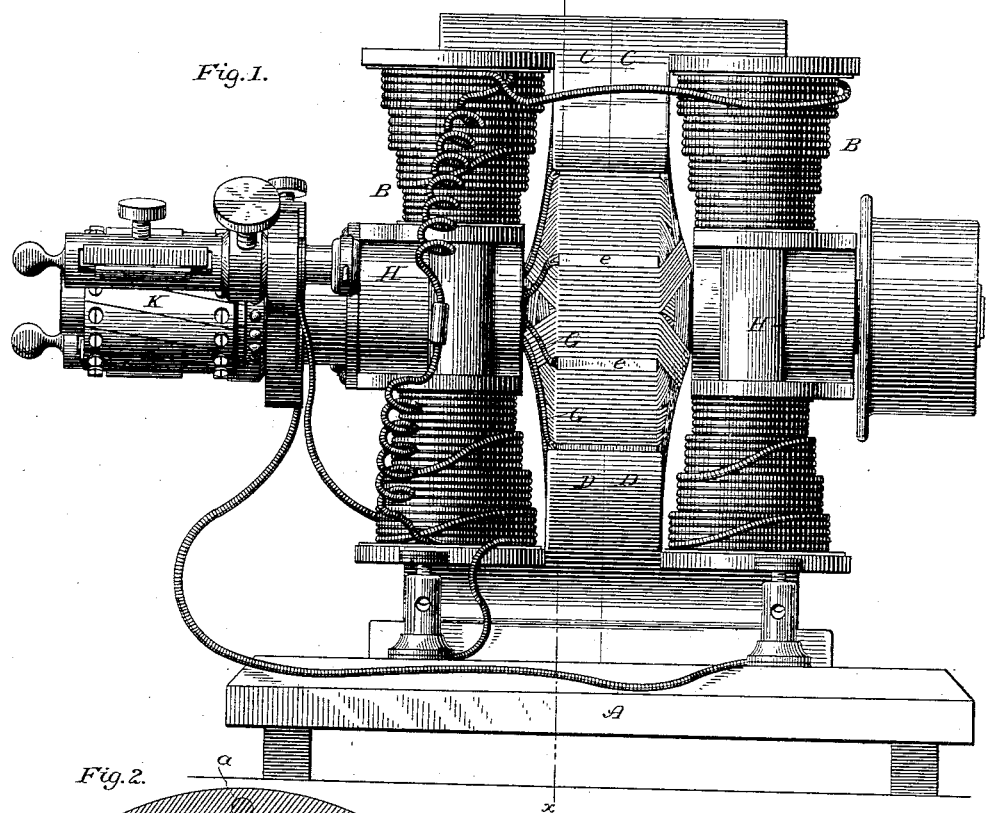
Figure 2:
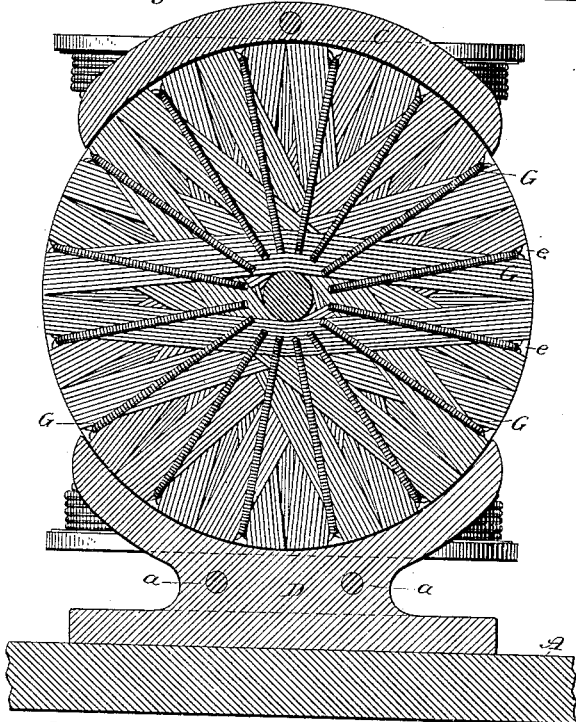
Figure 3:
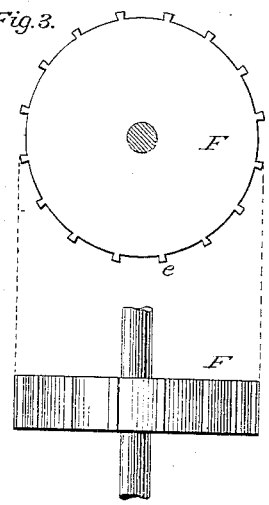

Figure 1 is a side elevation of a machine constructed in accordance with my invention; Fig. 2, a broken section on line $x\ x$ in Fig. 1; and Fig. 3, an edge and side view, on a reduced scale, of the armature-core without the coils.

The machine is mounted on any convenient base, as A. The field-magnets B B are composed of straight flat cores, to which are cast or secured right-angled projections C C D D. The magnets are held in position by bolts $a\ a$, which pass through the parts C C D D, and are secured to the base by the lower parts, D D, which are suitably widened for this purpose, as shown in Fig. 2. The parts C and D, when the field-magnets are clamped together, form pole-pieces, in which is concentrated the greater part of the magnetism induced by the coils on the magnets. Their opposing faces are rounded, so as to be concentric with the armature. Instead of forming these parts in the manner described, I may cast the pole-pieces separately, and bolt them to the ends of the cores of the field-magnets; or they may be formed and applied in other ways. The armature which is mounted between these field-magnets and pole-pieces consists of a disk, F, of solid iron or of superposed iron plates, with spaces or insulating material between them. The relative thickness of this disk may vary somewhat, though in general it should not exceed one-third or two-fifths its diameter. In the periphery of the disk are formed recesses or grooves, leaving projecting lugs $e$. The disk is wound in a direction parallel to the axis of rotation, with a double system of coils, which are laid in diametrically-opposite recesses. The coils are joined together, and connected to the segments of the commutator K by conductors G G, as explained in a patent granted to me October 29, 1878, No. 209,532. The armature-shaft passes through the cores of magnets B, in which are bearings H. The commutator K is fixed to the shaft outside the bearing, and the wires G G pass through the shaft to the plates of the commutator through the bearings, as described in my Patent No. 211,311.

The remaining parts of the machine—such as the brushes, brush-holders, circuits, &c.—being in all respects similar to the corresponding parts in other machines shown by me in various patents, are not here described at greater length.

It will be seen from the above description that the armature is practically inclosed by the field-magnets and the pole-pieces. It follows from this that the inductive effect on both the core and the conductors thereon is very greatly increased, and that on account of the shape of the armature and its proximity to the field-magnets, the magnetic circuit is so perfectly closed that but little free magnetism is exhibited outside the machine.

I have described, now, the most practicable and efficient embodiment of my invention of which I am at present aware. I do not, however restrict myself to the specific details of construction shown, as it is clear that they may be modified in many particulars. For example, without departure from my invention I may employ field-magnets of various kinds and pole-pieces of different character, and may also wind the armature-core in a great many ways.

The machine may be run as a motor, or for the development of currents. In either case the action and effects are substantially the same, and are superior in many respects to those attainable in other forms of machine.

Certain features of novelty other than those enumerated in the appended claims are exhibited in this machine, but are not specifically claimed herein, as I intend making them the subject of separate Letters Patent.

What I claim in this application is—

1. In a dynamo-electric machine or motor, an armature-core in the form of a disk, as described, in combination with coils wound thereon in a direction parallel with the axis of rotation of the core, substantially as set forth.

2. In a dynamo-electric machine or motor, an armature-core in the form of a disk, having peripheral recesses or grooves, in combination with coils wound thereon in a direction parallel to the axis of rotation, as set forth.

3. The combination, in a dynamo-electric machine or motor, with field-magnets, substantially as described, of a flat or disk-shaped armature mounted between the said magnets in bearings formed or set in the cores of the same, as set forth.

4. In a dynamo-electric machine or motor, the combination, with parallel field-magnets and pole-pieces bridging the cores of the same, of a flat or disk-shaped armature mounted in bearings formed or set in the cores of the magnets, as and for the purpose set forth.

In testimony whereof I have hereunto set my hand this 29th day of January, 1883.

EDWARD WESTON.

Witnesses:
PARKER W. PAGE,
W. FRISBY.